C. AUTH.
STORAGE BATTERY CHARGER.
APPLICATION FILED JAN. 22, 1915.

1,222,257.

Patented Apr. 10, 1917.
2 SHEETS—SHEET 1.

Witnesses:
Isabel Morris
Elsie Swenson

Inventor
Charles Auth
By his Attorney

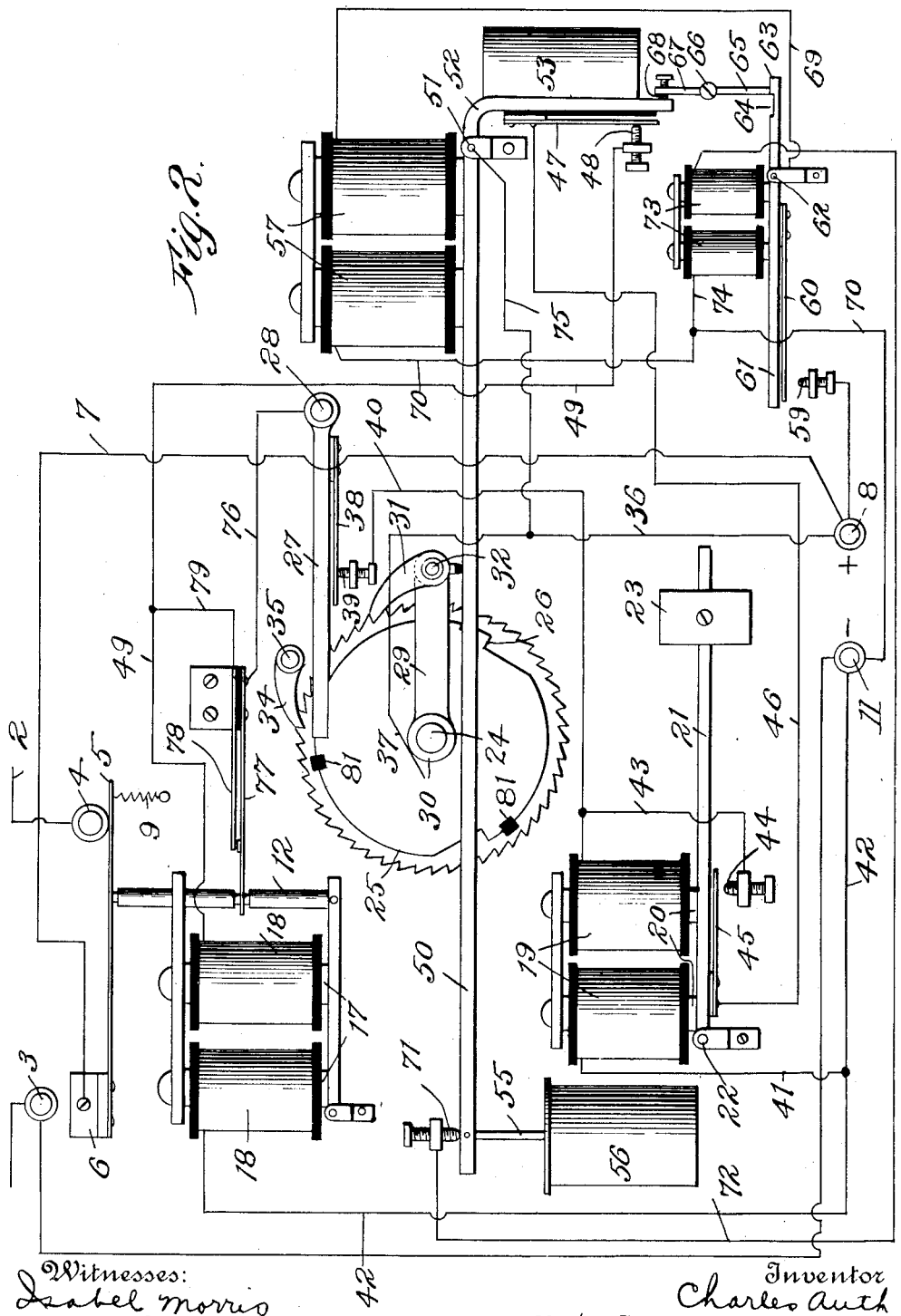

UNITED STATES PATENT OFFICE.

CHARLES AUTH, OF BROOKLYN, NEW YORK, ASSIGNOR TO EMMA LOUISE AUTH, OF BROOKLYN, NEW YORK.

STORAGE-BATTERY CHARGER.

1,222,257.                 Specification of Letters Patent.         Patented Apr. 10, 1917.

Application filed January 22, 1915. Serial No. 3,776.

*To all whom it may concern:*

Be it known that I, CHARLES AUTH, a citizen of the United States, and residing in the borough of Brooklyn, county of Kings, and State of New York, have invented certain new and useful Improvements in Storage-Battery Chargers, of which the following is a full and clear specification.

This invention relates to means for charging storage batteries and has for its primary object to provide improved apparatus for automatically connecting the storage battery system with a source of current supply and disconnecting the same after the storage battery has become fully charged. One of the objects of the present invention is to provide improved means for automatically testing the current strength of the storage battery to predetermine whether or not the high tension service is to be connected thereto to raise its voltage to normal. Another object is to provide improved means for making suitable circuit connections under the control of said testing means according to which after the charging circuit has once been completed, it is automatically maintained for a desirable period independently of said testing means. Another object is to provide improved means for operating the system. Other and further objects will appear in the specification and be pointed out in the appended claims, reference being had to the accompanying drawings which show an adaptation of my invention.

In the drawings,—

Fig. 2 is a similar view showing the relative positions of the parts under different conditions.

Figure 1:
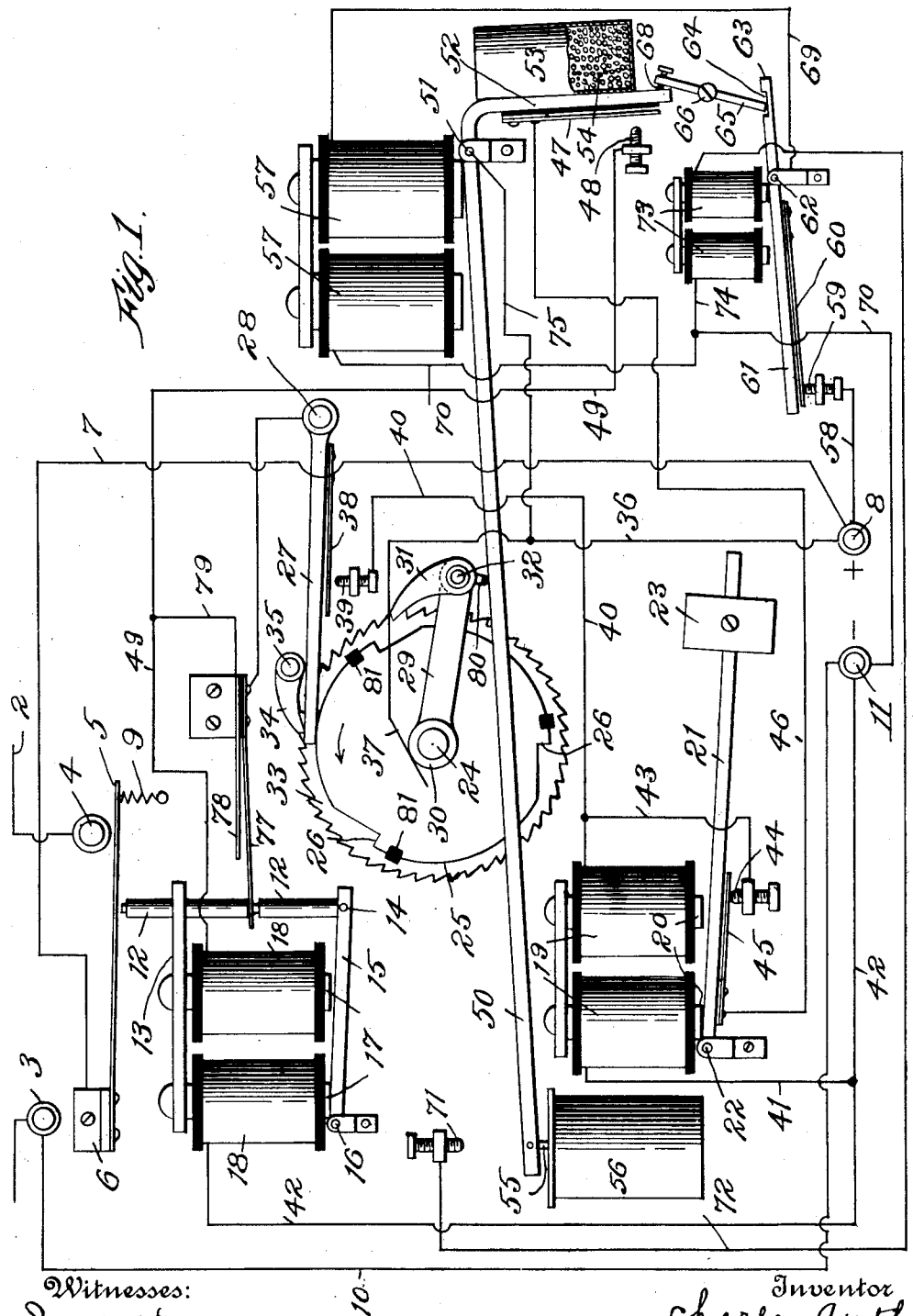
Figure 1 is a diagrammatic view in elevation, of one embodiment of my invention showing the relative positions of the parts under certain conditions.

Referring more particularly to the drawings, the wires 1 and 2 of a high tension service, such as that to be found in electric lighting systems, lead to suitable terminals 3 and 4. A movable contact 5 has one end secured to a conductor block 6 which is connected by a conductor 7 with the positive terminal 8 of the low tension service which includes the storage battery. A spring 9 normally retains the contact 5 in circuit opening position shown in Fig. 1. The terminal 3 of the high tension service is connected by a wire 10 to the negative terminal 11 of the low tension service. It will be seen therefore that whenever the contact 5 is moved upwardly into the position shown in Fig. 2, a charging circuit will be completed through the wire 2, terminal 4, contact 5, conductor 7, terminal 8 of the low tension system, terminal 11 of the same, conductor 10, terminal 3 of the high tension service and wire 1. Suitable means for closing this circuit are provided by a plunger 12 which is reciprocably mounted in a fixed plate 13 and has its lower end connected at 14 to an armature 15 pivotally mounted at 16 in any suitable support. Said armature 15 is adapted to be attracted by the soft iron cores 17 of magnets 18, so that whenever said magnets are energized in the manner to be presently pointed out, the plunger 12 is moved upwardly by the armature 15 to close the contact 5 against the terminal 4. According to my improved system, magnets 18 are energized only when the current strength of the low tension system is below a certain predetermined potential. The energizations of said magnets 18 are therefore under the control of a test relay comprising magnets 19 with soft iron cores 20, and an armature 21 pivotally mounted at 22 in any suitable support. The outer end of the armature 21 carries a weight 23 which is adjustably mounted to regulate the power required to be developed in the magnets 19 to raise the armature 21. Means for controlling the circuit which energizes the test magnets 19 is provided as follows: A shaft 24 which is journaled in any suitable bearings (not shown) has keyed thereto a disk 25 which is provided at regularly spaced intervals around its periphery with notches 26, said notches being adapted to permit a lever arm 27 to drop at certain predetermined times. The lever arm 27 is pivoted upon a stud 28 and is normally in running contact with the periphery of the disk 25. A vibratory arm 29 is provided with a hub portion 30 freely journaled upon the shaft 24. A pawl 31 pivotally mounted on a pin 32 carried by the outer end of the arm 29, coöperates with a ratchet 33 which is keyed to the shaft 24 to partake of the rotation of the disk 25. A dog 34 mounted on a fixed stud 35 is adapted to hold the ratchet 33 against reverse movement. Leading from the terminal 8 is a wire 36 which is connected to a brush 37 which slidably contacts with the hub 30 or disk 25. A contact blade 38 which is carried by the lever arm 27, is pressed against an adjustable contact 39 whenever the arm 27 drops into one of the notches 26. Leading from the contact 39 is a wire 40 which connects with the magnets 19 of the test relay, the other terminal of said magnets being connected by a wire 41 with a wire 42 leading to the negative terminal 11 of the low tension system. It will be seen therefore that whenever the arm 27 drops into one of the notches 26, a circuit is completed including plus terminal 8, wire 36, brush 37, disk 25, lever arm 27, contacts 38 and 39, wire 40, magnets 19, wire 41, wire 42 and minus terminal 11. This circuit when closed energizes the magnets 19 and if the voltage of the low tension system is sufficiently high to make it unnecessary to recharge the storage battery, the magnetism developed by the magnets 19 will be sufficient to lift the armature bar 21. Leading from the wire 40 is a branch wire 43 which is connected to an adjustable abutment 44, which normally bears against a contact blade 45, which is secured to the under face of the armature bar 21. Leading from the contact blade 45 is a wire 46 which is connected to a contact blade 47 which is pressed against an adjustable contact 48 whenever said blade 47 is moved to the left, as shown in Fig. 2. A wire 49 extends from the contact 48 to the magnets 18, the wire 42 being provided to connect said magnets to the minus terminal 11, so that whenever the blade 47 is pressed against the contact 48, the circuit is completed which energizes the magnets 18, provided the armature bar 21 is in lower position, as shown in Fig. 1, said circuit being as follows: plus terminal 8, wire 36, brush 37, disk 25, arm 27, contacts 38—39, wire 40, wire 43, contacts 44 and 45, wire 46, contacts 47—48, wire 49, magnets 18, wire 42 and minus terminal 11. The contact 47 is pressed against the contact 48 whenever a contact bar 50 is moved upwardly into the position shown in Fig. 2. The contact bar 50 is pivotally mounted on a pin 51 and provided with a downwardly deflected arm 52 to which is secured a receptacle 53 for holding any desired material 54, such as shot or sand or the like, to partially counterbalance the bar 50. Said bar, however, is sufficiently heavy to normally secure the position shown in Fig. 1. The blade 47 is mounted on the arm 52. A rod 55 connects the outer end of the bar 50 to the piston (not shown) of a dash pot 56, which retards the movement of said bar 50 in such a manner as to make the return downward movement relatively long in comparison to the upward movement under the influence of magnets 57 which attract said bar 50 whenever energized. An energizing circuit of the magnets 57 is provided as follows. A wire 58 leading from the terminal 8 connects with an adjustable abutment 59 which normally contacts with a blade contact 60 carried by an armature bar 61 which is pivotally mounted at 62 in any suitable support. Said bar 61 is provided with an oppositely extending arm 63 having a notch 64 for accommodating the lower arm 65 of a lever pivoted at 66, the upper arm 67 of said lever being provided with an adjustable abutment 68 which determines the position of the lever 65—67 according to the corresponding position of the contact bar 50. Leading from the pin 62 is a wire 69 which is connected to the magnets 57. Leading from the magnets 57 is a wire 70 which terminates in the minus terminal 11. It will be seen therefore that the parts having just assumed the positions shown in Fig. 1, the circuit for energizing the magnets 57 has just been closed. Immediately the contact bar 50 is drawn upwardly into the position shown in Fig. 2 in which the outer end of said bar comes into contact with an adjustable abutment 71 which is connected by a wire 72 with magnets 73, said magnets 73 being provided with a branch wire 74 which merges into the return wire 70 leading from the magnets 57. When therefore the contact bar 50 is raised into the position shown in Fig. 2, the following circuit is closed: plus terminal 8, wire 36, branch wire 75 which leads to pin 51, contact bar 50, contact 71, wire 72, magnets 73, wire 74, wire 70 and minus terminal 11. Immediately the armature 61 is raised together with the contact 60 which breaks the energizing circuit including magnets 57. Prior to this, however, the magnets 18 have been energized in the manner already pointed out, the upward movement of the plunger 12 serving to close another energizing circuit through the magnets 18. For this purpose, a branch wire 76 is provided to connect the pin 28 with a contact blade 77, the outer end of said contact blade being movably engaged by the plunger 12, so that when said plunger is moved upwardly into the positions shown in Fig. 2, the contact blade 77 is moved against a contact blade 78 which is connected by a wire 79 to the wire 49 leading to the magnets 18. Thus there is closed a circuit as follows: plus terminal 8, wire 36, brush 37, disk 25, lever arm 27, wire 76, contacts 77—78, wire 79, wire 49, magnets 18, wire 42 and minus terminal 11. This circuit maintains the energization of the magnets 18 after the downward movement of the contact bar 50 and causes the contacts 47 and 48 to be separated to break the circuit which formerly energized these magnets. The downward movement of the contact bar 50 is relatively slow, as has been pointed out. As shown in Fig. 2, when the contact bar is in raised position, the depending arm 52 permits the lower arm 65 of the lever pivoted at 66 to swing into position to block the return downward movement of the armature 61, thereby preventing the reëstablishment of the circuit which energizes the magnets 57. As the downward movement of the bar 50 continues, however, the arm 52 forces the lever 65—67 into the position shown in Fig. 1, thus permitting the armature 61 to drop and again establish the circuit which energized magnets 57. Depending from the vibratory arm 29 is a pin 80 which is engaged by the contact bar 50 during each upward movement of said bar, thus imparting an angular movement in the direction of the arrow to the disk 25 by means of the ratchet 33. Said ratchet, together with the movement of the contact bar 50 is suitably designed to produce a rotation of the disk 25 within any desired period of time, depending upon the desired period between the charges to the storage battery. At regularly spaced intervals corresponding to the spacing of the notches 26, are non-conducting lugs 81 which are adapted to engage the lever arm 27 within a suitable length of time after it has dropped into one of the notches 26. When this occurs, the last established energizing circuit of the magnets 18 is broken by the bar 27 being lifted away from the periphery of the disk 26. This permits the downward movement of the armature 15 which withdraws the plunger 12 and permits the spring 9 to retract the armature 5, thus breaking the charging circuit hereinbefore referred to.

The operation of my improved device will now be readily understood and briefly described is as follows:

Referring to Fig. 1, let it be supposed that the contact bar 50 has just reached the bottom of its movement and released the armature 61 to close the circuit which energizes the magnets 57. Immediately the contact bar 50 is moved upwardly to impart an angular movement to the disk 25 in the direction of the arrow. This operation is repeated automatically until the contact bar 27 drops into one of the notches 26, it having in the meantime passed over one of the insulated lugs 81 to terminate the last charging period. When said arm 27 drops into the next notch 26, the contacts 38—39 close the circuit which energizes the magnets 19 of the test relay by current from the storage battery. Said battery having just been restored to normal will energize the magnets 19 sufficiently to elevate the armature 21, thus separating the contacts 44 and 45 and making it impossible to again energize the magnets 18—18 at this time. Hence a charging circuit will not be established. Eventually, however, there comes a time when as the bar 27 drops into one of the notches 26, the circuit which energizes the magnets 19 is completed and the tension of the storage system will not be sufficient to cause the armature bar 21 to be lifted. Hence contacts 44 and 45 will remain closed while at the same time the upward movement of the contact bar 50 has closed the contacts 47 and 48, thus closing the circuit which energizes the magnets 18 and reestablishing the battery charging circuit. Almost immediately the contact bar 50 begins its downward movement but prior to the energizing circuit being broken at the contacts 47—48, has closed the contacts 77 and 78, which maintains the energization of the magnets 18, together with the charging circuit until one of the insulated lugs 81 lifts the arm 27 from the disk 25. During the time of the downward movement of the contact bar 50 which is of relatively long duration, the armature 61 is prevented from dropping to again cause the bar 50 to be lifted by the means of the lever 65—67 in the manner already pointed out. Obviously various changes in the connection and arrangement of parts could be embodied without departing from the broad spirit of my invention.

I claim:

1. A device of the character described, comprising circuit connections for uniting a high tension system to a low tension system for charging the latter, said connections including a normally open switch, means operated by the low tension system for closing said switch, means for testing the tension in said low tension system, and means operated by the current in said low tension system for throwing said testing means into and out of circuit with said low tension system.

2. A device of the character described comprising circuit connections for uniting a high tension system to a low tension system for charging the latter, said connections including means for testing the tension of said low tension system, and means for periodically connecting and disconnecting said testing means with said low tension system.

3. A device of the character described comprising circuit connections for uniting a high tension system to a low tension system for charging the latter, said connections including a normally open switch, electro-responsive means for closing said switch, a circuit for energizing said electro-responsive means, including a switch, a test electro-responsive device operatably related to the last said switch, and means for connecting said device with the low tension system.

4. A device of the character described comprising circuit connections for uniting a high tension system to a low tension system for charging the latter, said connections including a normally open switch, electro-responsive means for closing said switch, a circuit for energizing said electro-responsive means, including a switch, a test electro-responsive device operatably related to the last said switch, and means for connecting said device with the low tension system, said connecting means including a timing device for periodically establishing the connection between said low tension system and electro-responsive device.

5. A device of the character described comprising circuit connections for uniting a high tension system to a low tension system for charging the latter, said connections including a normally open switch, electro-responsive means for closing said switch, a circuit for energizing said electro-responsive means, including a switch, a test electro-responsive device operatably related to the last said switch, a circuit for connecting said electro-responsive device with said low tension system, said circuit being provided with a switch, and a timing device for controlling the last said switch.

6. A device of the character described comprising circuit connections for uniting a high tension system to a low tension system for charging the latter, said connections including a normally open switch, electro-responsive means for closing said switch, a circuit for energizing said electro-responsive means, including a switch, a test electro-responsive device operatably related to the last said switch, a circuit for connecting said electro-responsive device with said low tension system, said circuit being provided with a switch, and a timing device for controlling the last said switch, said timing device being provided with a motor operated by current from said low tension system.

7. A device of the character described comprising circuit connections for uniting a high tension system to a low tension system for charging the latter, said connections including a normally open switch, electro-responsive means for closing said switch, a circuit for energizing said electro-responsive means, including a switch, a test electro-responsive device operatably related to the last said switch, a circuit for connecting said electro-responsive device with said low tension system, said circuit being provided with a switch, a timing device for controlling the last said switch, an electro-responsive device for driving said timing device, and means for connecting said electro-responsive driving device to said low tension system.

8. A device of the character described comprising circuit connections for uniting a high tension system to a low tension system for charging the latter, said connections including a normally open switch, electro-responsive means for closing said switch, a circuit for energizing said electro-responsive means, including a switch, a test electro-responsive device operatably related to the last said switch, a circuit for connecting said electro-responsive device with said low tension system, said circuit being provided with a switch, a timing device for controlling the last said switch, an electro-responsive device for driving said timing device, and means for connecting said electro-responsive driving device to said low tension system, the last said means including a relay controlled by said timing device.

9. A device of the character described comprising circuit connections for uniting a high tension system to a low tension system for charging the latter, said connections including a normally open switch, electro-responsive means for closing said switch, a circuit for energizing said electro-responsive means, including a switch, a test electro-responsive device operatably related to the last said switch, a circuit for connecting said electro-responsive device with said low tension system, said circuit being provided with a switch, a timing device for controlling the last said switch, an electro-responsive device for driving said timing device, and means for connecting said electro-responsive driving device to said low tension system, the last said means including a relay controlled by said timing device, said timing device including an oscillatory switch bar for opening and closing the relay circuit.

10. A device of the character described comprising circuit connections for uniting a high tension system to a low tension system for charging the latter, said connections including a normally open switch, electro-responsive means for closing said switch, a circuit for energizing said electro-responsive means, including a switch, a test electro-responsive device operatably related to the last said switch, a circuit for connecting said electro-responsive device with said low tension system, said circuit being provided with a switch, a timing device for controlling the last said switch, an electro-responsive device for driving said timing device, and means for connecting said electro-responsive driving device to said low tension system, the last said means including a relay controlled by said timing device, said relay being provided with a switch and means controlled by said timing device for controlling the operation of said relay switch.

11. In apparatus of the character described, means for connecting a high tension charging system to a low tension system to be charged thereby, means for testing said low tension system, and a timing device operated by the current in said low tension system for controlling the operation of said testing means.

12. In apparatus of the character described, means for connecting a high tension charging system to a low tension system to be charged thereby, means for testing said low tension system, and a timing device operated by the current in said low tension system for controlling the operation of said testing means, said timing device including a periodically moved member and a circuit controlling switch operated thereby.

13. In apparatus of the character described, means for connecting a high tension charging system to a low tension system to be charged thereby, a relay energized by said low tension system and constituting a testing device therefor, and a timing device operated by the current in said low tension system for controlling the operation of said relay.

14. In apparatus of the character described, means for connecting a high tension charging system to a low tension system to be charged thereby, a relay for controlling the operation of said means, and means for energizing said relay including a timing device for controlling the operation of said relay, said timing device including a circuit-controlling bar, a disk over the periphery of which said bar slides, said disk being provided with notches at intervals to permit said bar to fall into circuit-closing position, and means for rotating said disk.

15. In apparatus of the character described, means for connecting a high tension charging system to a low tension system to be charged thereby, a relay for controlling the operation of said means, and means for energizing said relay including a timing device for controlling the operation of said relay, said timing device including a circuit-controlling bar, a disk over the periphery of which said bar slides, said disk being provided with notches at intervals to permit said bar to fall into circuit-closing position, and means for rotating said disk, said disk-rotating means including an oscillatory bar, means connecting said bar to said disk, a magnetic device for oscillating said bar, and an energizing circuit for said magnetizing device including said disk-rotating oscillatory bar.

16. In apparatus of the character described, a charging circuit provided with a switch, a source of energy, normally open contacts, an operating relay for closing said switch and contacts, a timing device, and a circuit including said source, contacts, relay, and timing device, said timing device comprising a rotary disk provided with peripheral notches and insulating lugs projecting beyond the periphery of said disk, a switch bar slidably contacting with the periphery of said disk, and a branch circuit for energizing said relay including a contact carried by said switch-bar, said contact being moved into circuit-closing position when the switch bar falls into one of said notches.

17. In apparatus of the character described, a charging circuit provided with a normally open switch, a relay for closing said switch, a timing device, a relay for testing the tension in a low tension system, a magnetic device for operating said timing device, a relay controlling said magnetic device, and suitable circuits for operating said relays and timing device.

CHARLES AUTH.

Witnesses:
 JOSEPH HUMPHREY,
 PERCY M. BROWN.